United States Patent
Gong et al.

(10) Patent No.: US 12,134,386 B2
(45) Date of Patent: Nov. 5, 2024

(54) SMOOTH COOPERATIVE LANE CHANGE CONTROL METHOD FOR MULTI-CONNECTED AND AUTONOMOUS VEHICLE (CAV)

(71) Applicant: CHANG'AN UNIVERSITY, Xi'an (CN)

(72) Inventors: Siyuan Gong, Xi'an (CN); Kang Sun, Xi'an (CN); Xiangmo Zhao, Xi'an (CN); Xia Wu, Xi'an (CN); Licheng Zhang, Xi'an (CN); Wenjing Wang, Xi'an (CN); Yukun Ding, Xi'an (CN); Congli Zhang, Xi'an (CN); Yihan Sun, Xi'an (CN); Hongda Chang, Xi'an (CN); Ze Li, Xi'an (CN); Lu Zeng, Xi'an (CN); Xinxin Wang, Xi'an (CN); Jiakai Yin, Xi'an (CN); Yuqian Ma, Xi'an (CN); Guohui Zheng, Xi'an (CN)

(73) Assignee: CHANG'AN UNIVERSITY, Xi'an (CN)

( * ) Notice: Subject to any disclaimer, the term of this patent is extended or adjusted under 35 U.S.C. 154(b) by 227 days.

(21) Appl. No.: 18/055,160

(22) Filed: Nov. 14, 2022

(65) Prior Publication Data
US 2023/0182741 A1  Jun. 15, 2023

(51) Int. Cl.
*B60W 30/18* (2012.01)
*B60W 50/00* (2006.01)
(Continued)

(52) U.S. Cl.
CPC .. *B60W 30/18163* (2013.01); *B60W 50/0097* (2013.01); *B60W 60/0013* (2020.02);
(Continued)

(58) Field of Classification Search
None
See application file for complete search history.

(56) References Cited

U.S. PATENT DOCUMENTS

2021/0078603 A1* 3/2021 Nakhaei Sarvedani ..................... B60W 30/18163
2023/0360534 A1* 11/2023 Avedisov ............. G08G 1/0112

FOREIGN PATENT DOCUMENTS

CN    112289076 A    1/2021
CN    114625155 A  *  6/2022
(Continued)

OTHER PUBLICATIONS

Du, Runjia et al., "A Cooperative Control Framework for CAV Lane Change in a Mixed Traffic Environment," 2020, arXiv, 2021 Annual Meeting of the Transportation Research Board (Year: 2020).*

(Continued)

*Primary Examiner* — Aniss Chad
*Assistant Examiner* — Madison R. Inserra

(57) ABSTRACT

A smooth cooperative lane change control method for multi-connected and autonomous vehicles (CAVs), including: acquiring vehicle information of a lane-changing vehicle M and four surrounding vehicles A, B, C and D; constructing uncontrolled-vehicle and controlled-vehicle motion state prediction models; according to the motion state prediction models, predicting motion states of the lane-changing vehicle M, and the vehicles A, B, C and D; constructing an upper-layer optimization model to calculate an optimal control value and an optimized motion state of the lane-changing vehicle M and an optimal control value of the vehicle A; constructing a lower-layer optimization model to calculate an optimal control value of the vehicle D; and controlling the lane-changing vehicle M, the vehicle A and the vehicle D to run according to a corresponding optimal control value.

9 Claims, 4 Drawing Sheets

(51) Int. Cl.
 *B60W 60/00* (2020.01)
 *G08G 1/16* (2006.01)
(52) U.S. Cl.
 CPC . *B60W 60/0027* (2020.02); *B60W 2050/0031* (2013.01); *B60W 2520/06* (2013.01); *B60W 2520/10* (2013.01); *B60W 2520/105* (2013.01); *B60W 2520/14* (2013.01); *B60W 2530/201* (2020.02); *B60W 2552/10* (2020.02); *B60W 2554/4041* (2020.02)

(56) References Cited

FOREIGN PATENT DOCUMENTS

| CN | 115230706 A | * | 10/2022 | ............ | B60W 30/09 |
| CN | 115320596 A | | 11/2022 | | |

OTHER PUBLICATIONS

Zhang, Zhiqiang et al., "An Enabling Trajectory Planning Scheme for Lane Change Collision Avoidance on Highways," Oct. 6, 2021, IEEE Transactions on Intelligent Vehicles, vol. 8, Issue 1, pp. 147-158 (Year: 2021).*

* cited by examiner

```
┌─────────────────────────────────────────────────────────────────┐
│ Acquiring vehicle information of a lane-changing vehicle M, and four surrounding │
│ vehicles A, B, C and D, where the lane-changing vehicle M is currently located in │
│ a main lane, in which the vehicles C and D are also located; the vehicle C is located │
│ in front of the lane-changing vehicle M, and the vehicle D is located behind the │
│ lane-changing vehicle M; the vehicles A and B are located in a target lane; the │
│ vehicle B is located in front of the lane-changing vehicle M, and the vehicle A │
│ is located behind the lane-changing vehicle M; the vehicles D and A are cooperative │
│ lane-changing vehicles of the lane-changing vehicle M; the vehicles D and A are │
│ controlled to behave cooperatively with the lane-changing vehicle M during a lane │
│ changing process, and the vehicle B and the vehicle C are uncontrolled. │
└─────────────────────────────────────────────────────────────────┘ ── S10
                                  │
                                  ▼
┌─────────────────────────────────────────────────────────────────┐
│ According to the vehicle information and parameters of the controlled vehicle, │
│ constructing a controlled-vehicle motion state prediction model; and according │
│ to the vehicle information and parameters of the uncontrolled vehicle, constructing │
│ an uncontrolled-vehicle motion state prediction model; and │
│ according to the uncontrolled-vehicle motion state prediction model and the │
│ controlled-vehicle motion state prediction model, predicting motion states of │
│ the lane-changing vehicle M, and of the vehicles A, B, C and D; │
│ where the uncontrolled-vehicle motion state prediction model includes a long │
│ short-term memory (LSTM)-based neural network model, and the │
│ controlled-vehicle motion state prediction model includes a vehicle kinematic │
│ model; │
│ and the vehicle kinematic model includes a steering kinematic model and a │
│ longitudinal kinematic model; │
│ the LSTM-based neural network model is configured to predict motion states │
│ of the vehicles B and C; and │
│ the steering kinematic model is configured to predict a motion state of the │
│ lane-changing vehicle M. │
└─────────────────────────────────────────────────────────────────┘ ── S20
                                  │
                                  ▼
┌─────────────────────────────────────────────────────────────────┐
│ Based on the vehicle information and the predicted motion states of the │
│ lane-changing vehicle M, and the vehicles A, B and C, constructing an │
│ upper-layer optimization model; and │
│ calculating an optimal control value of the lane-changing vehicle M, an │
│ optimized motion state of the lane-changing vehicle M and an optimal │
│ control value of the vehicle A according to the upper-layer optimization model. │
└─────────────────────────────────────────────────────────────────┘ ── S30
                                  │
                                  ▼
┌─────────────────────────────────────────────────────────────────┐
│ Based on the vehicle information of the lane-changing vehicle M, the vehicle C, │
│ and the vehicle D, the optimized motion state of the lane-changing vehicle M, │
│ and predicted motion states of the vehicles C and D, constructing a lower-layer │
│ optimization model; │
│ calculating an optimal control value of the vehicle D according to the lower-layer │
│ optimization model; and │
│ controlling the lane-changing vehicle M, the vehicle A and vehicle D to run │
│ according to a corresponding optimal control value. │
└─────────────────────────────────────────────────────────────────┘ ── S40
```

FIG. 1

SMOOTH COOPERATIVE LANE CHANGE CONTROL METHOD FOR MULTI-CONNECTED AND AUTONOMOUS VEHICLE (CAV)

TECHNICAL FIELD

This application relates to active safety control of connected and autonomous vehicles, and more particularity to a smooth cooperative lane change control method and device for a multi-connected and autonomous vehicle (CAV), and a terminal and a computer-readable storage medium.

BACKGROUND

Compared with the following behavior, the lane-changing behavior involves the combination of transverse and longitudinal motions and consideration of more vehicles, and thus its decision execution process is more complex and difficult to describe. It has been evidenced that the lane-changing behavior is a main reason causing the traffic perturbation, and such perturbation will eventually lead to traffic congestion, causing travel delay and additional fuel consumption and seriously affecting traffic efficiency. It has been published that 75% of lane-changing accidents are caused by driver's misoperation, and the lane-changing behavior leads to about 4%-10% of the total traffic accidents and 10% of the traffic delays.

With the rapid development of intelligent control and wireless communication technology, adopting vehicle-to-vehicle (V2V) communication to achieve cooperative control between CAVs has become an effective strategy to improve the traffic safety and traffic efficiency. In the networked environment, the V2V communication technology can provide the lane-changing vehicle with operation status information of surrounding vehicles within a wide area, so as to assist the CAV to make more reasonable driving decisions. Furthermore, the V2V communication can achieve the multi-vehicle synchronous cooperative control, thus effectively improving the driving safety and comfort, and greatly reducing the negative impact of lane-changing behavior on the traffic efficiency.

Regarding the existing multi-vehicle cooperative lane change control strategies, some assumptions are usually made to simplify the model solution. Notwithstanding these assumptions simplify the solution process, they also weaken the adaptability and practicability of the model to the dynamic traffic environment. In most of the existing cooperative lane change control strategies, the lane-changing behavior is usually divided into transverse motion and longitudinal motion for independent analysis, where the transverse motion is often described with an appropriate curve equation, and the correlation with the longitudinal motion is ignored. Although this assumption can simplify the modeling of the controller, it ignores the high coupling between the transverse direction and longitudinal direction, which may hinder the improvement of system performance. In addition, for the lane-changing vehicle and the following vehicle in the original lane, their leading vehicles will both change when the lane-changing vehicle make the lane change. The lane-changing vehicle will interfere with the longitudinal control of the following vehicles both in the original lane and the target lane during the process of gradually entering the target lane from the original lane. In the prior art, these changing processes are usually ignored to reduce the control targets, and it is usually considered that the lane-changing vehicle directly follows the leading vehicle in the target lane, and the following vehicle in the target lane also directly follows the lane-changing vehicle, and the transverse behavior of the lane change is instantaneous. These researches mainly take the vehicles in the target lane as the coordinated object, and for the vehicles following the lane-changing vehicle in the original lane, it is only required to satisfy the basic safety threshold with the lane-changing vehicle and no active intervention is performed. Such control strategy ignores the mobility of the original lane, which may lead to traffic oscillation in the original lane.

SUMMARY

In order to overcome the above-mentioned problems in the prior art, the present disclosure provides a smooth cooperative lane change control method and device for a CAV, and a terminal and a computer-readable storage medium.

Technical solutions of this application are specifically described as follows.

In a first aspect, this application provides a smooth cooperative lane change control method for a CAV, comprising:
  (a) acquiring vehicle information of a lane-changing vehicle M and four surrounding vehicles thereof, wherein the four surrounding vehicles are vehicle A, vehicle B, vehicle C and vehicle D, respectively; a lane where the lane-changing vehicle M is currently located is defined as a main lane, and the vehicle C and the vehicle D are located in the main lane; the vehicle C is located in front of the lane-changing vehicle M, and the vehicle D is located behind the lane-changing vehicle M; the vehicle A and the vehicle B are located in a target lane; the vehicle B is located in front of the lane-changing vehicle M, and the vehicle A is located behind the lane-changing vehicle M; the vehicle D and the vehicle A are configured as cooperative lane-changing vehicles of the lane-changing vehicle M; the vehicle D and the vehicle A are controlled to behave cooperatively with the lane-changing vehicle M during a lane changing process, and the vehicle B and the vehicle C are uncontrolled; the lane-changing vehicle M, the vehicle D and the vehicle A are each a connected and autonomous vehicle; and the vehicle B and the vehicle C are each a human-driven vehicle (HDV);
  (b) according to vehicle information and parameters of the vehicle B and the vehicle C, constructing an uncontrolled-vehicle motion state prediction model; and according to vehicle information and parameters of the lane-changing vehicle M, the vehicle A and the vehicle D, constructing a controlled-vehicle motion state prediction model; and
  according to the uncontrolled-vehicle motion state prediction model, predicting a motion state of the vehicle B and a motion state of the vehicle C; and according to the controlled-vehicle motion state prediction model, predicting a motion state of the lane-changing vehicle M, a motion state of the vehicle A, and a motion state of the vehicle D;
  wherein the uncontrolled-vehicle motion state prediction model comprises a long short-term memory (LSTM)-based neural network model; and the controlled-vehicle motion state prediction model comprises a vehicle kinematic model, and the vehicle kinematic model comprises a steering kinematic model and a longitudinal kinematic model;

the LSTM-based neural network model is configured to predict the motion state of the vehicle B and the motion state of the vehicle C, so as to obtain a predicted motion state of the vehicle B and a predicted motion state of the vehicle C, wherein the predicted motion state of the vehicle B and the predicted motion state of the vehicle C each comprise longitudinal position, longitudinal acceleration and longitudinal speed;

the steering kinematic model is configured to predict the motion state of the lane-changing vehicle M, so as to obtain a predicted motion state of the lane-changing vehicle M, wherein the predicted motion state of the lane-changing vehicle M comprises longitudinal position increment $\dot{y}_M$, transverse position increment $\dot{x}_M$, yaw angle increment $\dot{\varphi}_m$ and axial speed increment $\dot{v}_M$; $x_M$ is a transverse position of the lane-changing vehicle M; $y_M$ is a longitudinal position of the lane-changing vehicle M; $\varphi_M$ is a yaw angle of the lane-changing vehicle M; and $v_M$ is an axial speed of the lane-changing vehicle M; and the longitudinal kinematic model is configured to predict the motion state of the vehicle A and the motion state of the vehicle D, wherein the motion state of the vehicle A and the motion state of the vehicle D each comprise longitudinal position increment $\dot{x}_i$ and longitudinal speed increment $\dot{v}_i$, wherein $x_i$ is a longitudinal position of the vehicle A and the vehicle D, and $v_i$ is a longitudinal speed of the vehicle A and the vehicle D;

(c) based on vehicle information and predicted motion states of the lane-changing vehicle M, the vehicle A, the vehicle B and the vehicle C, constructing an upper-layer optimization model; and calculating an optimal control value and an optimized motion state of the lane-changing vehicle M and an optimal control value of the vehicle A according to the upper-layer optimization model; and (d) based on vehicle information of the lane-changing vehicle M, the vehicle C and the vehicle D, the optimized motion state of the lane-changing vehicle M and predicted motion states of the vehicle C and the vehicle D, constructing a lower-layer optimization model;

calculating an optimal control value of the vehicle D according to the lower-layer optimization model; and controlling the lane-changing vehicle M, the vehicle A and vehicle D to run according to a corresponding optimal control value.

In some embodiments, the motion state of the vehicle B and the motion state of the vehicle C are predicted by using the LSTM-based neural network model through steps of:

acquiring a motion state of the vehicle B in previous m steps and a motion state of the vehicle C in previous m steps, wherein a sampling step interval is dt; and inputting the motion state of the vehicle B in previous m steps and the motion state of the vehicle C in previous m steps into the LSTM-based neural network model which has been trained according to HDV motion state, to obtain a motion state of the vehicle B in next N steps and a motion state of the vehicle C in next N steps.

In some embodiments, the steering kinematic model is expressed as:

$$\begin{cases} \dot{x}_M = v_M \cos\varphi_M \\ \dot{y}_M = v_M \sin\varphi_M \\ \dot{\varphi}_M = v_M \dfrac{\tan\delta_M}{L} \\ \dot{v}_M = a_M \end{cases};$$

wherein $x_M$ is a transverse position of the lane-changing vehicle M; $y_M$ is a longitudinal position of the lane-changing vehicle M; $\varphi_M$ is a yaw angle of the lane-changing vehicle M; $v_M$ is an axial speed of the lane-changing vehicle M; $\delta_M$ is a front-wheel steering angle of the lane-changing vehicle M; $a_M$ is acceleration of the lane-changing vehicle M; and L is a wheelbase of the lane-changing vehicle M.

In some embodiments, the longitudinal kinematic model is expressed as:

$$\begin{cases} \dot{x}_i = v_i \\ \dot{v}_i = a_i \end{cases}; i = A, D;$$

wherein $x_i$ (i=A, D) is the longitudinal position of the vehicle A and the vehicle D; $v_i$ (i=A, D) is the longitudinal speed of the vehicle A and the vehicle D; and $a_i$ (i=A, D) is an acceleration of the vehicle A and the vehicle D.

In some embodiments, a differential form of the steering kinematic model is expressed as:

$$\begin{cases} x_M(k+1) = x_M(k) + v_M(k)\cos(\varphi_M(k))dt, k = 1,2, \ldots, N-1 \\ y_M(k+1) = y_M(k) + v_M(k)\sin(\varphi_M(k))dt, k = 1,2, \ldots, N-1 \\ \varphi_M(k+1) = \varphi_M(k) + v_M(k)\dfrac{\tan(\delta_M(k))}{L}dt, k = 1,2, \ldots, N-1 \\ v_M(k+1) = v_M(k) + a_M(k)dt, k = 1,2, \ldots, N-1 \end{cases}.$$

In some embodiments, a differential form of the longitudinal kinematic model is expressed as:

$$\begin{cases} x_i(k+1) = v_i(k) + v_i(k)dt + a_i(k)dt^2/2 \\ v_i(k+1) = v_i(k) + a_i(k)dt \end{cases}, i = A, D; k = 1,2, \ldots, N-1;$$

wherein dt is a sampling step interval; and N is a length of a predictive horizon.

In some embodiments, an objective function of the upper-layer optimization model corresponds to a minimum of a sum of costs of comfort, tracking and traffic efficiency of the lane-changing vehicle M, the vehicle A, the vehicle B and the vehicle C; and an objective function of the lower-layer optimization model corresponds to a minimum of a sum of costs of comfort, tracking and traffic efficiency of the lane-changing vehicle M, the vehicle C and the vehicle D.

In a second aspect, this application provides a smooth cooperative lane change control device for a CAV, comprising:

an acquisition unit;

a construction unit;

an upper-layer controller; and a lower-layer controller;

wherein the acquisition unit is configured to acquire vehicle information of a lane-changing vehicle M and four surrounding vehicles thereof, wherein the four surrounding vehicles are respectively vehicle A, vehicle B, vehicle C and vehicle D; a lane where the lane-changing vehicle M is currently located is defined as a main lane, and the vehicle C and vehicle D are located in the main lane; the vehicle C is located in front of the lane-changing vehicle M, and the vehicle D is located behind the lane-changing vehicle M; the vehicle A and the vehicle B are located in a target lane; the vehicle B is located in front of the lane-changing vehicle M, and the vehicle A is located behind the lane-changing vehicle M; the vehicle D and the vehicle A are configured as cooperative lane-changing vehicles of the lane-changing vehicle M; the vehicle D and the vehicle A are controlled to behave cooperatively with the lane-changing vehicle M during a lane changing process, and the vehicle B and the vehicle C are uncontrolled;

the construction unit is configured to construct an uncontrolled-vehicle motion state prediction model according to vehicle information and parameters of the vehicle B and the vehicle C to predict a motion state of the vehicle B and a motion state of the vehicle C, and construct a controlled-vehicle motion state prediction model according to vehicle information and parameters of the lane-changing vehicle M, the vehicle A and the vehicle D to predict a motion state of the lane-changing vehicle M, a motion state of the vehicle A and a motion state of the vehicle D;

the upper-layer controller is configured to construct an upper-layer optimization model based on vehicle information and predicted motion states of the lane-changing vehicle M, the vehicle A, the vehicle B and the vehicle C, and calculate an optimal control value of the lane-changing vehicle M, an optimized motion state of the lane-changing vehicle M and an optimal control value of the vehicle A according to the upper-layer optimization model, so as to control the lane-changing vehicle M and the vehicle A; and the lower-layer controller is configured to construct a lower-layer optimization model based on vehicle information of the lane-changing vehicle M, the vehicle C, and the vehicle D, the optimized motion state of the lane-changing vehicle M, and predicted motion states of the vehicle C and the vehicle D, and to calculate an optimal control value of the vehicle D according to the lower-layer optimization model to control the vehicle D.

In a third aspect, this application provides a terminal, comprising:

a memory; and a processor;

wherein the memory is configured to store a computer program; and the processor is configured to execute the computer program to implement the smooth cooperative lane change control method.

In a fourth aspect, this application provides a non-transitory computer-readable storage medium, wherein the non-transitory computer-readable storage medium is configured to store a computer program; and the computer program is configured to be executed by a processor to implement the smooth cooperative lane change control method.

Compared to the prior art, this application has the following beneficial effects.

Regarding the smooth cooperative lane change control method provided herein, the vehicle dynamics is modeled firstly, and the transverse motion and longitudinal motion of the lane-changing vehicle are input to a unified control value for regulation. According to the vehicle dynamics, a multi-vehicle cooperative lane change control strategy based on model predictive control is established to obtain an optimal control input of each CAV. Each CAV executes the optimal control input to realize safe and smooth lane change, and simultaneously ensures the stability of vehicle following on the original and target lanes so as to improve the road traffic efficiency of the two lanes.

The present disclosure will become more understandable from the following description. It should be understood that the following description is merely exemplary and illustrative, and are not intended to limit the scope of the present disclosure.

BRIEF DESCRIPTION OF THE DRAWINGS

In order to illustrate the technical solutions of the present disclosure or the prior art more clearly, the accompany drawings needed to be used in the description of the embodiments or the prior art will be briefly described below. Obviously, presented in the accompany drawings are merely some embodiments of the present disclosure, and other drawings can be obtained by those skilled in the art based on the drawings provided herein without paying creative effort.

FIG. 1 is a flow chart of a smooth cooperative lane change control method for multi-connected and autonomous vehicles (CAVs) according to an embodiment of the present disclosure;

Figure 2:
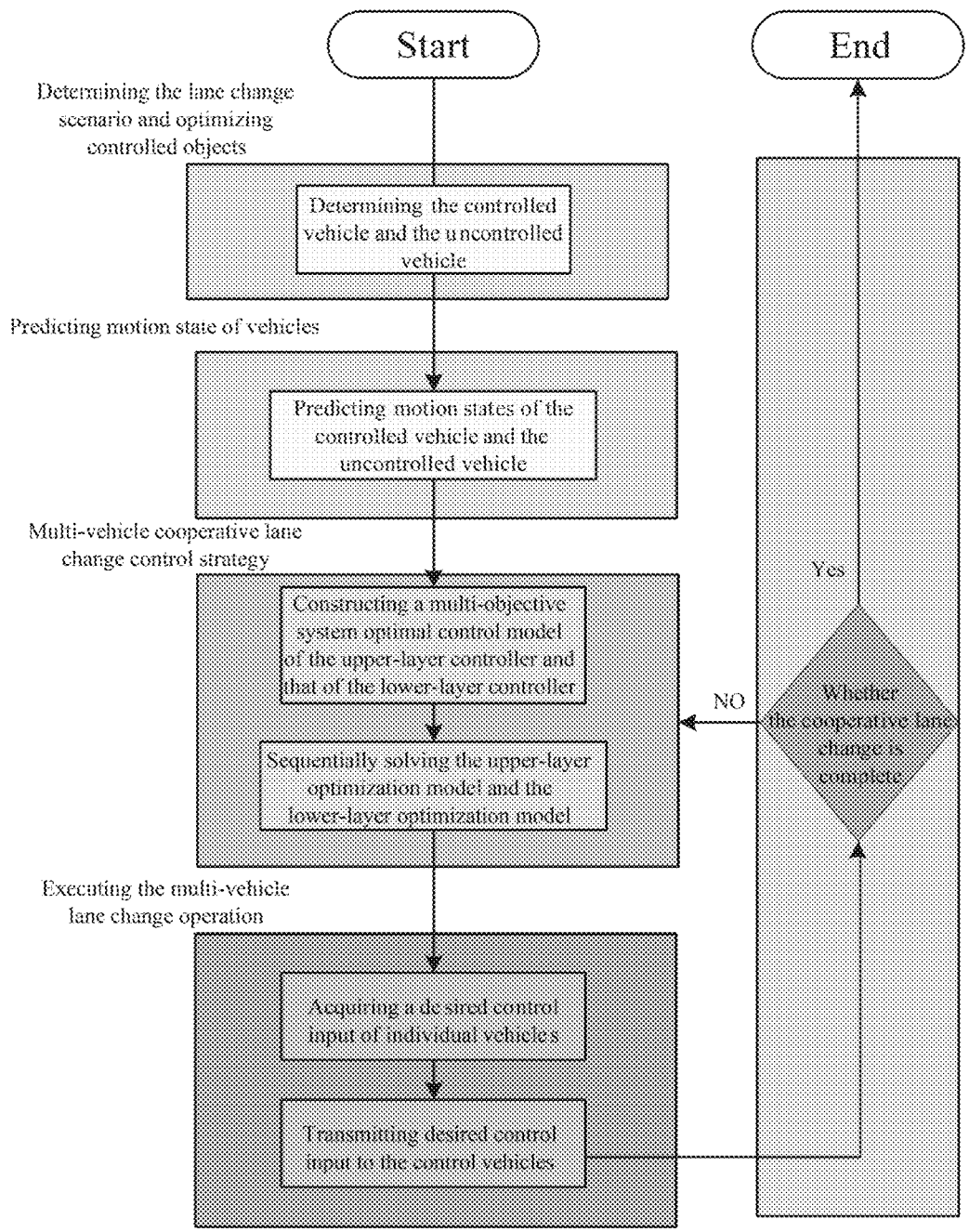
FIG. 2 depicts detailed steps of the smooth cooperative lane change control method according to an embodiment of the present disclosure.

In the drawings: 100, acquisition unit; 200, construction unit; 300, upper-layer controller; and 400, lower-layer controller.

DETAILED DESCRIPTION OF EMBODIMENTS

The disclosure will be described completely and clearly below with reference to the accompanying drawings and embodiments to make the technical solutions of the present disclosure clearer. Obviously, provided below are merely some embodiments of the disclosure, which are not intended to limit the disclosure. Based on the embodiments provided herein, all other embodiments obtained by those skilled in the art without paying any creative effort shall fall within the scope of the present disclosure.

The flow chart is illustrative only, and does not necessarily include all elements and operations/steps, nor does it have to be performed in the order described. For example, some operations/steps can also be split, combined, or partially combined, so the actual order may accordingly change.

It should be understood that the terms are used for describing particular embodiments only and are not intended to limit the disclosure. Unless otherwise specified, the singular forms "a", "an" and "the" are intended to include the plural.

The embodiments of this application will be described in detail below with reference to the accompanying drawings.

Referring to FIG. 1, a smooth cooperative lane change control method for a CAV includes the following steps.

(S10) Vehicle information of a lane-changing vehicle M and four surrounding vehicles thereof are acquired, where the four surrounding vehicles are vehicle A, vehicle B, vehicle C and vehicle D, respectively. A lane where the lane-changing vehicle M is currently located is defined as a main lane, and the vehicle C and the vehicle D are located in the main lane; the vehicle C is located in front of the lane-changing vehicle M, and the vehicle D is located behind the lane-changing vehicle M. The vehicle A and the vehicle B are located in a target lane. The vehicle B is located in front of the lane-changing vehicle M, and the vehicle A is located behind the lane-changing vehicle M. The vehicle D and the vehicle A are configured as cooperative lane-changing vehicles of the lane-changing vehicle M. The vehicle D and the vehicle A are controlled to behave cooperatively with the lane-changing vehicle M during a lane changing process, and the vehicle B and the vehicle C are uncontrolled; the lane-changing vehicle M, the vehicle D and the vehicle A are each a connected and autonomous vehicle; and the vehicle B and the vehicle C are each a human-driven vehicle (HDV).

The lane change occurs at an expressway in which HDV and CAV are in mixed traffic.

(S20) According to vehicle information and parameters of the lane-changing vehicle M and the vehicle C, an uncontrolled-vehicle motion state prediction model is constructed. According to vehicle information and parameters of the lane-changing vehicle M, the vehicle A and the vehicle D, a controlled-vehicle motion state prediction model is constructed.

According to the uncontrolled-vehicle motion state prediction model, a motion state of the vehicle B and a motion state of the vehicle C are predicted. According to the controlled-vehicle motion state prediction model, a motion state of the lane-changing vehicle M, a motion state of the vehicle A, and a motion state of the vehicle D are predicted.

The uncontrolled-vehicle motion state prediction model includes a long short-term memory (LSTM)-based neural network model. The controlled-vehicle motion state prediction model includes a vehicle kinematic model. The vehicle kinematic model includes a steering kinematic model and a longitudinal kinematic model.

The LSTM-based neural network model is configured to predict the motion state of the vehicle B and the motion state of the vehicle C, so as to obtain a predicted motion state of the vehicle B and a predicted motion state of the vehicle C, where the predicted motion state of the vehicle B and the predicted motion state of the vehicle C each include longitudinal position, longitudinal acceleration and longitudinal speed.

The motion state of the vehicle B and the motion state of the vehicle C are predicted by using the LSTM-based neural network model through the following steps.

A motion state of the vehicle B in previous m steps and a motion state of the vehicle C in previous m steps are acquired, in which a sampling step interval is dt. The motion state of the vehicle B in previous m steps and the motion state of the vehicle C in previous m steps are input into the LSTM-based neural network model which has been trained according to HDV motion state, to obtain a motion state of the vehicle B in next N steps and a motion state of the vehicle C in next N steps.

The steering kinematic model is configured to predict the motion state of the lane-changing vehicle M, so as to obtain a predicted motion state of the lane-changing vehicle M. The predicted motion state of the lane-changing vehicle M includes longitudinal position increment $\dot{y}_M$, transverse position increment $\dot{x}_M$, yaw angle increment $\dot{\varphi}_M$ and axial speed increment $\dot{v}_M$. $x_M$ is a transverse position of the lane-changing vehicle M; $y_M$ is a longitudinal position of the lane-changing vehicle M; $\varphi_M$ is a yaw angle of the lane-changing vehicle M; and $v_M$ is an axial speed of the lane-changing vehicle M.

The steering kinematic model is expressed as follows:

$$\begin{cases} \dot{x}_M = v_M \cos\varphi_M \\ \dot{y}_M = v_M \sin\varphi_M \\ \dot{\varphi}_M = v_M \frac{\tan\delta_M}{L} \\ \dot{v}_M = a_M \end{cases};$$

where $x_M$ is a transverse position of the lane-changing vehicle M; $y_M$ is a longitudinal position of the lane-changing vehicle M; $\varphi_M$ is a yaw angle of the lane-changing vehicle M; $v_M$ is an axial speed of the lane-changing vehicle M; $\delta_M$ is a front-wheel steering angle of the lane-changing vehicle M; $a_M$ is acceleration of the lane-changing vehicle M; and L is a wheelbase of the lane-changing vehicle M (distance between front and rear axles); $\dot{x}_M$ represents longitudinal position increment of the lane-changing vehicle M; $\dot{y}_M$ represents transverse position increment of the lane-changing vehicle M; $\dot{\varphi}_M$ represents yaw angle increment of the lane-changing vehicle M; and $\dot{v}_M$ represents axial speed increment of the lane-changing vehicle M (namely, acceleration).

The longitudinal kinematic model is configured to predict the motion state of the vehicle A and the motion state of the vehicle D, where the motion state of the vehicle A and the motion state of the vehicle D each include longitudinal position increment $\dot{x}_i$ and longitudinal speed increment $\dot{v}_i$, where $x_i$ is a longitudinal position of the vehicle A and the vehicle D, and $v_i$ is a longitudinal speed of the vehicle A and the vehicle D.

The controlled-vehicle motion state prediction model is a longitudinal kinematic model, which is expressed as follows.

$$\begin{cases} \dot{x}_i = v_i \\ \dot{v}_i = a_i \end{cases}; i = A, D;$$

where $x_i$ (i=A, D) is the longitudinal position of the vehicle A and the vehicle D; $v_i$ (i=A, D) is the longitudinal speed of the vehicle A and the vehicle D; and $a_i$ (i=A, D) is an acceleration of the vehicle A and the vehicle D.

Since the motion state prediction model of the lane-chaining vehicle M is a nonlinear model, it needs to be discretized during a single-step prediction. However, the discretization will cause model accuracy loss, therefore the original continuous model is differentiated. Considering the consistency of the motion state prediction of the controlled vehicle, the motion state prediction models of vehicle M and vehicles A and D are differentiated.

A differential form of the steering kinematic model is expressed as:

$$\begin{cases} x_M(k+1) = x_M(k) + v_M(k)\cos(\varphi_M(k))dt, k = 1,2,\ldots,N-1 \\ y_M(k+1) = y_M(k) + v_M(k)\sin(\varphi_M(k))dt, k = 1,2,\ldots,N-1 \\ \varphi_M(k+1) = \varphi_M(k) + v_M(k)\frac{\tan(\delta_M(k))}{L}dt, k = 1,2,\ldots,N-1 \\ v_M(k+1) = v_M(k) + a_M(k)dt, k = 1,2,\ldots,N-1 \end{cases}.$$

A differential form of the longitudinal kinematic model is expressed as:

$$\begin{cases} x_i(k+1) = v_i(k) + v_i(k)dt + a_i(k)dt^2/2 \\ v_i(k+1) = v_i(k) + a_i(k)dt \end{cases}, i = A, D; k = 1,2, \ldots, N-1;$$

where dt is a sampling step interval; and N is a length of a predictive horizon. (S30) Based on vehicle information and predicted motion states of the lane-changing vehicle M, the vehicle A, the vehicle B and the vehicle C, an upper-layer optimization model is constructed.

An optimal control value and an optimized motion state of the lane-changing vehicle M and an optimal control value of the vehicle A are calculated according to the upper-layer optimization model, so as to control the lane-changing vehicle M and the vehicle A.

Regarding the upper-layer optimization model, the lane-changing vehicle M and the vehicle A are taken as optimization objects, and the motion states of the vehicle B and the vehicle C are taken as inputs. The lane-changing vehicle M and vehicle A are actively controlled to realize the active cooperative driving of the vehicle A, so as to provide a safe lane change gap for the lane-changing vehicle M and ensure that the lane-changing vehicle M can safely and smoothly enter to the target lane. After the lane-changing vehicle M enters the target lane, the vehicle A and the vehicle B quickly enter the stable following behavior, so as to reduce the negative impact on the upstream traffic of the target.

An objective function of the upper-layer optimization model is as follows:

$$\min J_1(s) = \sum_{k=1}^{N} \left[ \omega_{e_y} \|e_y(s+k)\|^2 + \omega_{e_{ya}} e_{y_1}(s+k) + \omega_{e_{\widetilde{x1}}} \|\widetilde{e_{x1}}(s+k)\|^2 + \right.$$
$$\left. \omega_{e_{\widetilde{v1}}} \|\widetilde{e_{v1}}(s+k)\|^2 + \omega_{e_{v3}} \|e_{v3}(s+k)\|^2 + \omega_{e_{x3}} \|e_{x3}(s+k)\|^2 \right] +$$
$$\sum_{k=1}^{N-1} \left[ \omega_\delta \|\delta_M(s+k)\|^2 + \omega_a \|a_M(s+k)\|^2 + \right.$$
$$\left. \omega_{a_y} \|a_{My}(s+k)\|^2 + \omega_{a1} \|a_A(s+k)\|^2 \right] +$$
$$\sum_{k=1}^{N-2} \left[ \omega_{\dot\delta} \|j_{\delta_M}(s+k)\|^2 + \omega_{\dot a} - \|j_{a_M}(s+k)\|^2 + \omega_{\dot a1} \|j_{a_A}(s+k)\|^2 \right];$$

where $J_1(s)$ represents a sum of costs of comfort, tracking and traffic efficiency in the objective function of the upper-layer optimization model; a discrete time interval is dt. N represents a time domain of prediction; $\omega_{e_y}$, $\omega_{e_{ya}}$, $\omega_{e_{\widetilde{x1}}}$, $\omega_{e_{\widetilde{v1}}}$, $\omega_{e_{v3}}$, $\omega_{e_{x3}}$, $\omega_\delta$, $\omega_a$, $\omega_{a_y}$, $\omega_{a1}$, $\omega_{\dot\delta}$, $\omega_{\dot a}$ and $\omega_{\dot a1}$ are weighting factors of corresponding term; *(s+k) represents a predicted state at moment s+k; and s is the current moment.

In the first summation term in the objective function of the upper-layer optimization model, the first two terms represent the penalty on a transverse tracking error of the lane-changing vehicle M, the middle two terms represent the penalty on the longitudinal tracking error of the lane-changing vehicle M considering the front vehicle change, and the last two terms represent the penalty on the longitudinal tracking error of the vehicle A. In the second summation term, the first three terms respectively represent penalties on a desired control front wheel steering angle, acceleration and transverse acceleration of the lane-changing vehicle M, and the last term represents a penalty on a desired acceleration of the vehicle A. In the third summation term, the first two terms represent penalties on the front wheel steering angle and change rate of acceleration of the lane-changing vehicle M, and the last term represents a penalty on the change rate of acceleration of the vehicle A.

Regarding the first summation term in the objective function of the upper-layer optimization model, $e_y(s+k)$ represents a transverse tracking error of vehicle, which is expressed as follows:

$$e_y(s+k) = y_M(s+k) - w;$$

where $y_M(s+k)$ represents a transverse position of lane-changing vehicle M; and w is a lane width. According to this expression, in order to complete the transverse movement as soon as possible, the difference between the current transverse position of the lane-changing vehicle M and a total distance of the target transverse movement w should be reduced as soon as possible.

Regarding the first summation term in the objective function of the upper-layer optimization model, $e_{y_1}(s+k)$ represents a constraint control for the lane-changing vehicle M transverse tracking control, which is expressed as follows:

$$e_{y_1}(s+k) = \exp^{a(y_M(s+k)-c)} + \exp^{-b(y_M(s+k)-c)};$$

where a, b and c are relevant control parameters. The purpose of this expression is to constrain the lane-changing vehicle M to continue its transverse movement and prevent the lane-changing vehicle M from deviation from the target lane centerline after reaching the target lane centerline, so as to effectively ensure safety. When the transverse position $y_M(s+k)$ is less than the total transverse distance w, the function value is minimum, and when the transverse position $y_M(s+k)$ is greater than the total transverse distance w, the function value increases sharply.

Regarding the first summation term in the objective function of the upper-layer optimization model, $\widetilde{e_{x1}}(s+k)$ represents a longitudinal spacing tracking error considering the front vehicle change of the lane-changing vehicle M, which is expressed as follows:

$$\widetilde{e_{x1}}(s+k) = [1 - S(s+k)]e_{x1}(s+k) + S(s+k)e_{x2}(s+k);$$

where $e_{x1}(s+k)$ represents a longitudinal spacing tracking error of the lane-changing vehicle M with respect to a front vehicle, that is vehicle C, on the original lane, and $e_{x1}(s+k) = [x_C(s+k) - x_M(s+k)] - d_{exp\_M}(s+k)$; $e_{x2}(s+k)$ represents a longitudinal spacing tracking error of the lane-changing vehicle M with respect to a front vehicle, that is vehicle B, on the target lane, and $e_{x2}(s+k) = [x_B(s+k) - x_M(s+k)] - d_{exp\_M}(s+k)$; $x_C(s+k)$ is a longitudinal position of the vehicle C, $x_M(s+k)$ is a longitudinal position of the lane-changing vehicle M, and $x_B(s+k)$ a longitudinal position of the vehicle B; $d_{exp\_M}(s+k)$ is a desired longitudinal spacing of the lane-changing vehicle M from a front vehicle being tracked of it. $d_{exp\_M}(s+k)$ is the desired longitudinal spacing of the lane-changing vehicle M from a front vehicle, which follows the principle of constant headway, and is expressed as follows:

$$d_{exp\_M}(s+k) = v_{Mx}(s+k) * t_{hd} + d_0;$$

where $v_{Mx}(k)$ represents the longitudinal speed of the lane-changing vehicle M; $v_{Mx}(s+k) = v_M(s+k)\cos(\varphi_m(s+k))$; $t_{hd}$ represents desired headway time distance; and $d_0$ represents a fixed minimum safety distance.

The S(s+k) is an S-type switching function, which smooths the variation of longitudinal tracking gap during front vehicle change of the lane-changing vehicle M. When the transverse position $y_M(s+k)$ is greater than w/2, a scale factor is greater than 0.5 and will grow at a faster trend to close to 1. When the transverse position $y_M(s+k)$ is less than w/2, the scale factor is less than 0.5. When the transverse position $y_M(s+k)$ starts at zero for a period of time, the scale factor remains at zero, and when the $y_M(s+k)$ gradually reaches to w/2, the scale factor is close to 0.5.

The purpose of optimizing the longitudinal spacing tracking error of the lane-changing vehicle M is to ensure that a desired longitudinal spacing between the lane-changing vehicle M and the front vehicle being tracked is tracked as fast as possible, while the vehicle in front is changed smoothly from the vehicle C at the original lane to the vehicle B at the target lane.

Regarding the first summation term in the objective function of the upper-layer optimization model, $\widetilde{e_{v1}}(s+k)$ is a longitudinal speed tracking error considering the front vehicle change of the lane-changing vehicle M, which is expressed as follows:

$$\widetilde{e_{v1}}(s+k) = [1-S(s+k)]e_{v1}(s+k) + S(s+k)e_{v2}(s+k);$$

where $e_{v1}(s+k)$ represents a longitudinal speed tracking error of the lane-changing vehicle M to the front vehicle thereof, that is vehicle C, at the original lane; $e_{v1}(s+k) = v_{Mx}(s+k) - v_C(s+k)$; $e_{v2}(s+k)$ represents a longitudinal speed tracking error for the lane-changing vehicle M to the front vehicle thereof, that is vehicle B, at the target lane; $e_{v2}(s+k) = v_{Mx}(s+k) - v_B(s+k)$; $v_C(s+k)$ is a longitudinal speed of the vehicle C; $v_B(s+k)$ is a longitudinal speed of the vehicle B; $S(s+k)$ is the same as the S-type switching function used in the longitudinal spacing tracking error.

The purpose of optimizing the longitudinal speed tracking error of the lane-changing vehicle M is to ensure that a longitudinal speed of the front vehicle being tracked is tracked as fast as possible by the lane-changing vehicle M while the front vehicle being tracked is changed smoothly from the vehicle C at the original lane to the vehicle B at the target lane.

Regarding the first summation term in the objective function of the upper-layer optimization model, $e_{x3}(s+k)$ represents longitudinal spacing tracking error of the vehicle A, which is expressed as follows:

$$e_{x3}(s+k) = [x_A(s+k) - x_M(s+k)] - d_{exp\_A}(s+k);$$

where $x_A(s+k)$ represents a longitudinal position of the vehicle A; $d_{exp\_M}(s+k)$ represents desired longitudinal spacing between the lane-changing vehicle M and a front vehicle being tracked; $d_{exp\_A}(s+k) = v_A(s+k)*t_{hd} + d_0$; $v_A(s+k)$ represents a longitudinal speed of the vehicle A. Since the vehicle A is configure to actively provide space for the lane-changing vehicle M to change, the lane-changing vehicle M is regarded as the front vehicle being tracked of the vehicle A. The purpose of optimizing the longitudinal spacing tracking error of the vehicle A is to make the vehicle A to reach the desired longitudinal spacing from the lane-changing vehicle M as quickly as possible.

Regarding the first summation term in the objective function of the upper-layer optimization model, $e_{v3}(s+k)$ represents longitudinal speed tracking error of the vehicle A, which is expressed as follows:

$$e_{v3}(s+k) = v_A(s+k) - v_{Mx}(s+k).$$

The purpose of optimizing the longitudinal speed tracking error of the vehicle A is to make the vehicle A to reach the longitudinal speed of the lane-changing vehicle M as fast as possible.

Regarding the second summation term in the objective function of the upper-layer optimization model, $a_{My}(s+k)$ represents the transverse acceleration of the lane-changing vehicle M, which is expressed as follows:

$$a_{My}(s+k) = [v_{My}(s+k+1) - v_{My}(s+k)]/dt;$$

where $v_{My}(s+k)$ represents a transverse speed of the lane-changing vehicle M; and $v_{My}(s+k) = v_M(s+k)\sin(\varphi_M(s+k))$.

Regarding the third summation term in the objective function of the upper-layer optimization model, $j_{\delta_M}(s+k)$ represents a front wheel steering angle of the lane-changing vehicle M; $j_{a_M}(s+k)$ represents change rate of acceleration of the lane-changing vehicle M; and $j_{a_A}(s+k)$ represents change rate of acceleration of the vehicle A (the change rate of acceleration is usually named as jerk);

$$j_{\delta_M}(s+k) = [\delta_M(s+k+1) - \delta_M(s+k)]/dt;$$

$$j_{a_M}(s+k) = [a_M(s+k+1) - a_M(s+k)]/dt; \text{ and}$$

$$j_{a_A}(s+k) = [a_A(s+k+1) - a_A(s+k)]/dt.$$

The purpose of optimizing the front wheel steering angle and the acceleration of the lane-changing vehicle M and the acceleration of the vehicle A, as well as the change rate of the lane-changing vehicle M and the change rate of the vehicle A is to ensure that the control inputs to the lane-changing vehicle M and the vehicle A are as small as possible, and that the amplitude and frequency of change are as small as possible to ensure driving comfort.

The constraints of the upper-layer optimization model are as follows:

$$x_M(s+k+1) = x_M(s+k) + v_M(s+k)\cos(\varphi_M(s+k))dt, k = 1,2,\ldots,N-1$$

$$y_M(s+k+1) = y_M(s+k) + v_M(s+k)\sin(\varphi_M(s+k))dt, k = 1,2,\ldots,N-1$$

$$\varphi_M(s+k+1) = \varphi_M(s+k) + v_M(s+k)\frac{\tan(\delta_M(s+k))}{L}dt, k = 1,2,\ldots,N-1$$

$$v_M(s+k+1) = v_M(s+k) + a_M(s+k)dt, k = 1,2,\ldots,N-1$$

$$x_A(s+k+1) = x_A(s+k) + v_A(s+k)dt + \frac{a_A(s+k)dt^2}{2}, k = 1,2,\ldots,N-1$$

$$v_A(s+k+1) = v_A(s+k) + a_A(s+k)dt, k = 1,2,\ldots,N-1$$

$$S_{M\_i}(s+k) \geq S_{safe,M\_i}(s+k), k = 1,2,\ldots,N, i = A, B, C$$

$$v_{My}(s+k) = v_M(s+k)\sin(\varphi_M(s+k)) \leq v_{y\_min}, k = 1,2,\ldots,N$$

$$a_{min} \leq a_M(s+k) \leq a_{max}, k = 1,2,\ldots,N-1$$

$$\delta_{min} \leq \delta_M(s+k) \leq \delta_{max}, k = 1,2,\ldots,N-1$$

$$a_{min} \leq a_A(s+k) \leq a_{max}, k = 1,2,\ldots,N-1$$

Regarding the constraints of the upper-layer optimization model, the first six constraints are motion state prediction model constraints for the lane-changing vehicle M and the vehicle A. The seventh constraint represents that a distance between two vehicles should not be less than the minimum safe distance. $S_{M_i}(s+k)$ represents the actual longitudinal spacing between the lane-changing vehicle M and the vehicle i (i=A, B, C) at moment s+k. The eighth constraint indicates that the transverse speed of the lane-changing vehicle M should be limited to a certain range. $a_{min}$ is minimum acceptable and comfortable acceleration of the lane-changing vehicle M and the vehicle A, and $a_{max}$ is maximum acceptable and comfortable acceleration of the lane-changing vehicle M and the vehicle A. $\delta_{min}$ is minimum comfortable front wheel deflection angle of the lane-changing vehicle M, and $\delta_{max}$ is maximum comfortable front wheel deflection angle of the lane-changing vehicle M. The last four constraints ensure the safety and comfort of the controlled lane-changing vehicle M and the vehicle A in the cooperative lane-changing process, such that their control values are within an allowable range.

Since the objective function of the upper-layer optimization model is a multi-objective cooperative optimal control problem, a rolling horizon optimization algorithm is used to solve the problem. With the advance of the sampling time, the deviation of each discrete sampling time is optimized repeatedly in the rolling finite time interval to obtain the desired input of the lane-changing vehicle M and the vehicle A, such that the active cooperation between the lane-changing vehicle and the target lane vehicle is realized. Within the device prediction domain, the optimal control problem is solved stepwise and dynamically by using the rolling horizon optimization algorithm. Since the optimization model is constructed in differential form, the traditional solver based on the state is no longer applicable, such that the Python optimization modeling object (Pyomo) package is used to obtain the optimal control input of the lane-changing vehicle M and the vehicle A.

The first element of the optimized predicted motion state of the lane-changing vehicle M and the vehicle A are acquired, and then input into a vehicle model to obtain the desired optimum throttle opening and the optimum brake pedal pressure of the lane-changing vehicle M and the vehicle A, so as to achieve the optimal control of the driving and braking of the lane-changing vehicle M and the vehicle A.

(S40) Based on vehicle information of the lane-changing vehicle M, the vehicle C and the vehicle D, the optimized motion state of the lane-changing vehicle M and predicted motion states of the vehicle C and the vehicle D, a lower-layer optimization model is constructed.

An optimal control value of the vehicle D is calculated according to the lower-layer optimization model to control the vehicle D.

The lane-changing vehicle M, the vehicle A and vehicle D is controlled to run according to a corresponding optimal control value.

Specifically, the first term of a control sequence input by the upper-layer optimization model and the first term of a control sequence input by the lower-layer optimization model are selected as the optimal control value. The optimized predicted motion state can be determined according to these control sequences.

Regarding the lower-layer optimization model, the vehicle D is taken as an object to be optimized, and the optimized predicted motion state of the lane-changing vehicle M and a motion state of the vehicle C are taken as input. A control goal of the lower-layer optimization model is to allow the lane-changing vehicle M to smoothly track the front vehicle in the process of the lane-changing vehicle M gradually moving from the original lane to the target lane by actively controlling vehicle D, so as to reduce the negative impact on the upstream traffic.

An objective function of the lower-layer optimization model is expressed as follows:

$$\min J_2(s) = \Sigma_{k=1}^{N}(\widetilde{e_{x2}} \|\omega_{\widetilde{e_{x2}}}(s+k)\|^2 + \omega_{\widetilde{e_{v2}}} \|\widetilde{e_{v2}}(s+k)\|^2) + \Sigma_{k=1}^{N-1}(\omega_{a2}\|a_D(s+k)\mu^2) + \Sigma_{k=1}^{N-2}(\omega_{\tilde{a}2}\|j_{a_D}(s+k)\|^2);$$

where $J_2(s)$ represents a sum of costs of comfort, tracking and traffic efficiency in the objective function of the lower-layer optimization model; $\omega_{\widetilde{e_{x2}}}$, $\omega_{\widetilde{e_{v2}}}$, $\omega_{a2}$ and $\omega_{\tilde{a}2}$ are weighting factors of corresponding term; *(s+k) represents a predicted state at moment s+k; and s is the current moment.

The first summation term in the objective function of the lower-layer optimization model represents a penalty on a longitudinal tracking error of the vehicle D considering the front vehicle change. The second summation term in the objective function represents a penalty on the desired acceleration of the vehicle D. The third summation term in the objective function represents a penalty on change rate of acceleration of the vehicle D.

Regarding the first summation term in the objective function of the lower-layer optimization model, $\widetilde{e_{x2}}(s+k)$ represents longitudinal spacing tracking error considering the front vehicle change of the vehicle D, which is expressed as follows:

$$\widetilde{e_{x2}}(s+k) = [1 - S(s+k)]e_{x4}(s+k) + S(s+k)e_{x5}(s+k);$$

where $e_{x4}(s+k)$ represents a longitudinal spacing tracking error of the vehicle D to the original front vehicle in front of the vehicle D, that is lane-changing vehicle M, in the original lane of the vehicle D; $e_{x4}(s+k) = [x_M(s+k) - x_D(s+k)] - d_{exp\_D}(s+k)$; $e_{x5}(s+k)$ represents a longitudinal spacing tracking error of the vehicle D to the new front vehicle in front of the vehicle D, that is the vehicle C, in the original lane of the vehicle D; $e_{x5}(s+k) = [x_C(s+k) - x_D(s+k)] - d_{exp\_M}(s+k)$; $x_D(s+k)$ represents the longitudinal position of the vehicle D; $d_{exp\_D}(s+k)$ is the desired longitudinal spacing between the vehicle D and a vehicle in front tracked by the vehicle D; $d_{exp\_D}(s+k) = v_D(s+k)*t_{hd} + d_0$; the expression and function of the S-type switching function used in the longitudinal spacing and speed tracking error between the vehicle A and the lane-changing vehicle M are the same.

The purpose of optimizing the longitudinal spacing tracking error of the vehicle D is to ensure that the desired longitudinal spacing between the vehicle D and the vehicle in front is achieved as quickly as possible while smoothly switching the vehicle in front from the lane-changing vehicle M to the vehicle C on the original lane.

Regarding the first summation term in the objective function of the lower-layer optimization model, $\widetilde{e_{v2}}(s+k)$ represents longitudinal speed tracking error considering front vehicle change of the vehicle D, which is expressed as follows:

$$\widetilde{e_{v2}}(s+k) = [1 - S(s+k)]e_{v4}(s+k) + S(s+k)e_{v5}(s+k);$$

where $e_{v4}(s+k)$ represents a longitudinal speed tracking error of the vehicle D to the original front vehicle thereof, that is the lane-changing vehicle M, at the original lane; $e_{v4}(s+k) = v_D(s+k) - v_{Mx}(s+k)$; $e_{v5}(s+k)$ represents a longitudinal speed tracking error of the vehicle D to the new front vehicle thereof, that is the vehicle C, at the original lane; $e_{v5}(s+k) = v_D(s+k) - v_C(s+k)$; and $S(s+k)$ is the same as the S-type switching function used in the longitudinal spacing tracking error.

The purpose of optimizing the longitudinal speed tracking error of the vehicle D is to ensure that a longitudinal speed of the front vehicle being tracked is tracked as fast as possible by the vehicle D while the front vehicle being tracked is changed smoothly from the lane-changing vehicle M at the original lane to the vehicle C at the original lane.

Regarding the third summation term in the objective function of the lower-layer optimization model, $j_{a_D}(s+k)$ represents a change rate of acceleration of the vehicle D, which is expressed as follows:

$$j_{a_D}(s+k)=[a_D(s+k+1)-a_D(s+k)]/dt.$$

The purpose of optimizing the acceleration and change rate thereof of the vehicle D is to ensure that the control input of the vehicle D and the amplitude and frequency of variation are as small as possible to ensure driving comfort.

The constraints of the lower-layer optimization model are as follows:

$$\begin{cases} x_D(s+k+1) = x_D(s+k) + v_D(s+k)dt + \dfrac{a_D(s+k)dt^2}{2}, k=1,2,\ldots,N-1 \\ v_D(s+k+1) = v_D(s+k) + a_D(s+k)dt, k=1,2,\ldots,N-1 \\ S_{D_i}(s+k) \geq S_{safe,D_i}(s+k), k=1,2,\ldots,N, i=M,C \\ a_{min} \leq a_D(s+k) \leq a_{max}, k=1,2,\ldots,N-1 \end{cases}$$

Regarding the constraints of the lower-layer optimization model, the first two constraints are motion state prediction model constraints for the vehicle D. The third constraint represents that a distance between two vehicles should not be less than the minimum safe distance. $S_{D_i}(s+k)$ represents the actual longitudinal spacing between the vehicle D and the vehicle i (i=M, C) at time s+k. The last constraint ensures the safety and comfort of the controlled vehicle D, and that their control values are within the allowable range.

The objective functions of the upper-layer optimization model and the lower-layer optimization model are respectively solved dynamically step by step through the rolling time domain optimization algorithm for the optimal control problem. In the rolling finite time interval, the deviation of each moment is optimized repeatedly, and the desired control input of each controlled vehicle is obtained.

The solution method of the lower-layer optimization model refers to the rolling time domain optimization in the upper-layer optimization model. By solving the optimal control input of the vehicle D, extracting the first element of the optimal control input and inputting the first element into a vehicle model, the optimal throttle opening and the optimal brake pedal pressure desired by the vehicle D are obtained, and the optimal control of the driving and braking of the cooperative vehicle D is realized.

Specifically, by controlling motion state prediction model according to a vehicle, the transverse and longitudinal desired control parameters of that lane-changing vehicle M and longitudinal desired control parameters of the cooperative vehicle A and vehicle D are obtained. By controlling the engine throttle opening, brake pedal and automatic transmission of each vehicle, the control strategy of multi-vehicle cooperative lane change is realized.

The lane change occurs at an expressway in which HDV and CAV are in mixed traffic. By acquiring motion state information of the surrounding vehicles in real time and constructing a lane-changing model with a hierarchical controller architecture, in which the lane-changing model considers the safety, comfort, traffic efficiency and other constraints of lane change, the CAV can perform cooperative lane change safely. (1) The cooperative lane change control method provided herein based on model predictive control integrates the longitudinal and transverse motions during lane change. Compared with the framework analyzing the longitudinal and transverse independently, the acceleration and front wheel steering angle are integrated into a unified control management, which is more practical. (2) The following vehicles in the target lane and the original lane are regarded as cooperative vehicles, and their active cooperative driving can effectively reduce the negative impact of lane change on the two lanes. (3) The S-type function is designed to solve the problem of front vehicle changing and tracking, which provides a smooth front vehicle changing method for the controlled vehicle in the lane changing process, and can effectively avoid the speed oscillation caused by the sudden change of the front vehicle.

It should be understood that the above-described order is merely exemplary, and is not intended to limit the disclosure. Unless otherwise specified, such processes can be performed in another order. Moreover, some steps may include multiple sub-steps or stages, and these sub-steps or stages are not necessarily executed at the same time, and are not necessarily executed sequentially. Optionally, such sub-steps or stages may be executed in turn or alternately with at least part of sub-steps or stages in other steps.

Figure 3:
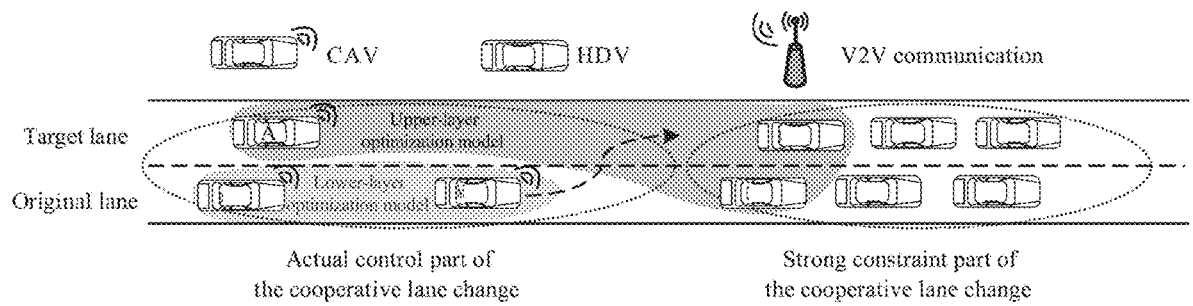
FIG. 3 shows a multi-vehicle cooperative lane-changing scenario in which the smooth cooperative lane change control method is applied.

Referring to an embodiment illustrated in FIG. 3, a smooth cooperative lane change control device for CAVs is provided, which includes an acquisition unit 100, a construction unit 200, an upper-layer controller 300 and a lower-layer controller 400.

The acquisition unit 100 is configured to acquire vehicle information of a lane-changing vehicle M and four surrounding vehicles thereof, where the four surrounding vehicles are respectively vehicle A, vehicle B, vehicle C and vehicle D. A lane where the lane-changing vehicle M is currently located is defined as a main lane, and the vehicle C and vehicle D are located in the main lane; the vehicle C is located in front of the lane-changing vehicle M, and the vehicle D is located behind the lane-changing vehicle M. The vehicle A and the vehicle B are located in a target lane. The vehicle B is located in front of the lane-changing vehicle M, and the vehicle A is located behind the lane-changing vehicle M. The vehicle D and the vehicle A are configured as cooperative lane-changing vehicles of the lane-changing vehicle M. The vehicle D and the vehicle A are controlled to behave cooperatively with the lane-changing vehicle M during a lane changing process, and the vehicle B and the vehicle C are uncontrolled. The vehicle B and the vehicle C are HDV.

The construction unit 200 is configured to construct an uncontrolled-vehicle motion state prediction model according to vehicle information and parameters of the vehicle B and the vehicle C to predict a motion state of the vehicle B and a motion state of the vehicle C, and construct a controlled-vehicle motion state prediction model according to vehicle information and parameters of the lane-changing vehicle M, the vehicle A and the vehicle D to predict a motion state of the lane-changing vehicle M, a motion state of the vehicle A and a motion state of the vehicle D.

The upper-layer controller 300 is configured to construct an upper-layer optimization model based on vehicle information and predicted motion states of the lane-changing vehicle M, the vehicle A, the vehicle B and the vehicle C, and calculate an optimal control value of the lane-changing vehicle M, an optimized motion state of the lane-changing vehicle M and an optimal control value of the vehicle A according to the upper-layer optimization model, so as to control the lane-changing vehicle M and the vehicle A. The upper-layer controller takes the lane-changing vehicle M as a central controller.

The lower-layer controller 400 is configured to construct a lower-layer optimization model based on vehicle information of the lane-changing vehicle M, the vehicle C, and the vehicle D, the optimized motion state of the lane-changing vehicle M, and predicted motion states of the vehicle C and the vehicle D, and to calculate an optimal control value of the vehicle D according to the lower-layer optimization model to control the vehicle D. The lower-layer controller is located in the vehicle D.

Figures 4, 5:
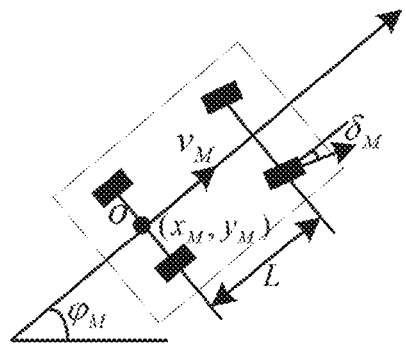
FIG. 4 shows a steering kinematic model of a lane-changing vehicle according to an embodiment of the present disclosure.
FIG. 5 is a block diagram of a smooth cooperative lane change control device according to an embodiment of the present disclosure.

Referring to FIG. 5, in an embodiment, a terminal is provided, which includes a processor, a communication interface, a memory and a communication bus. The processor, the communication interface and the memory are communicated through the communication bus.

The memory is configured to store a computer program, and the processor is configured to execute the computer program to implement the smooth cooperative lane change control method.

The communication bus can be peripheral component interconnect (PCI) bus or extended industry standard architecture (EISA) bus. The communication bus can be divided into an address bus, a data bus, a control bus and the like. It should be understood that although the communication bus is represented by a single thick line in the drawings, it does not indicate that there is only one bus or one type of bus.

The communication interface is configured to allow the terminal to communicate with other devices.

The memory includes random access memory (RAM) and non-volatile memory, for example, at least one disk storage. In an embodiment, the memory is at least one storage device located remotely from the processor.

The processor is central processing unit (CPU), network processor (NP), digital signal processing (DSP), application specific integrated circuit (ASIC) or field-programmable gate array (FPGA), or other programmable logic devices, discrete gate or transistor logic devices, discrete hardware components.

The terminal includes a user device and a network device. The user device includes computer, smart phone and pad. The network device includes a single network server, a server group consisting of multiple network servers and a cloud consisting of a large number of computers or network servers based on cloud computing. The cloud computing is a kind of distributed computing, which is a super virtual computer consisting of a group of loosely coupled computer sets. The disclosure can be implemented by the terminal independently, or accessing to the network and interacting with other terminals. The network includes internet, wide area network, metropolitan area network, local area network and virtual private network.

It should also be understood that when the term "and/or" indicates any combination and all possible combinations of one or more of the associated listed items, and including these combinations.

This application also provides a non-transitory computer-readable storage medium. The non-transitory computer-readable storage medium is configured to store a computer program. The computer program is configured to be executed to implement the smooth cooperative lane change control method.

It can be understood by those skilled in the art that the method of the above embodiments can be implemented by a computer program instructing related hardware, the computer program can be stored in a nonvolatile computer-readable storage medium, and when being executed, the computer program can include the processes of the above embodiment. Any reference to memory, storage, databases, or other media used in the embodiments provided herein may include at least one of non-volatile and volatile memory.

It should be understood that unless otherwise specified, the singular form "a/an" also includes the plural form. The term "and/or" should be considered to include all possible combinations of the listed items. The serial numbers of the embodiments are descriptive only, and are not intended to imply which embodiment is better.

It should be noted that described above are merely illustrative of the disclosure, and are not intended to limit the disclosure. The features of various embodiments may be combined to form other embodiments based on the technical concept disclosed herein. It should be understood that any changes, replacements and improvements made by those skilled in the art based on the content disclosed herein without paying creative effort shall fall within the scope of the present disclosure defined by the appended claims.

What is claimed is:

1. A smooth cooperative lane change control method for a multi-connected and autonomous vehicle (CAV), comprising:

(a) acquiring vehicle information of a lane-changing vehicle M and four surrounding vehicles thereof, wherein the four surrounding vehicles are vehicle A, vehicle B, vehicle C and vehicle D, respectively; a lane where the lane-changing vehicle M is currently located is defined as a main lane, and the vehicle C and the vehicle D are located in the main lane; the vehicle C is located in front of the lane-changing vehicle M, and the vehicle D is located behind the lane-changing vehicle M; the vehicle A and the vehicle B are located in a target lane; the vehicle B is located in front of the lane-changing vehicle M, and the vehicle A is located behind the lane-changing vehicle M; the vehicle D and the vehicle A are configured as cooperative lane-changing vehicles of the lane-changing vehicle M; the vehicle D and the vehicle A are controlled to behave cooperatively with the lane-changing vehicle M during a lane changing process, and the vehicle B and the vehicle C are uncontrolled; the lane-changing vehicle M, the vehicle D and the vehicle A are each a connected and autonomous vehicle; and the vehicle B and the vehicle C are each a human-driven vehicle (HDV);

(b) according to vehicle information and parameters of the vehicle B and the vehicle C, constructing an uncontrolled-vehicle motion state prediction model; and according to vehicle information and parameters of the lane-changing vehicle M, the vehicle A and the vehicle D, constructing a controlled-vehicle motion state prediction model; and according to the uncontrolled-vehicle motion state prediction model, predicting a motion state of the vehicle B and a motion state of the vehicle C; and according to the controlled-vehicle motion state prediction model, predicting a motion state of the lane-changing vehicle M, a motion state of the vehicle A, and a motion state of the vehicle D;

wherein the uncontrolled-vehicle motion state prediction model comprises a long short-term memory (LSTM)-based neural network model; and the controlled-vehicle motion state prediction model comprises a vehicle kinematic model, and the vehicle kinematic model comprises a steering kinematic model and a longitudinal kinematic model;

the LSTM-based neural network model is configured to predict the motion state of the vehicle B and the motion state of the vehicle C, so as to obtain a predicted motion state of the vehicle B and a predicted motion state of the vehicle C, wherein the predicted motion state of the vehicle B and the predicted motion state of the vehicle C each comprise longitudinal position, longitudinal acceleration and longitudinal speed;

the steering kinematic model is configured to predict the motion state of the lane-changing vehicle M, wherein a predicted motion state of the lane-changing vehicle M comprises longitudinal position increment $\dot{y}_M$, transverse position increment $\dot{x}_M$, yaw angle increment $\dot{\varphi}_M$ and axial speed increment $\dot{v}_M$; and the longitudinal kinematic model is configured to predict the motion state of the vehicle A and the motion state of the vehicle D, wherein the motion state of the vehicle A and the motion state of the vehicle D each comprise longitudinal position increment $\dot{x}_i$ and longitudinal speed increment $\dot{v}_i$, wherein $x_i$ is a longitudinal position of the vehicle A and the vehicle D, and $v_i$ is a longitudinal speed of the vehicle A and the vehicle D;

(c) based on vehicle information and predicted motion states of the lane-changing vehicle M, the vehicle A, the vehicle B and the vehicle C, constructing an upper-layer optimization model; and calculating an optimal control value and an optimized motion state of the lane-changing vehicle M and an optimal control value of the vehicle A according to the upper-layer optimization model; and (d) based on vehicle information of the lane-changing vehicle M, the vehicle C and the vehicle D, the optimized motion state of the lane-changing vehicle M and predicted motion states of the vehicle C and the vehicle D, constructing a lower-layer optimization model;

calculating an optimal control value of the vehicle D according to the lower-layer optimization model; and controlling the lane-changing vehicle M, the vehicle A and vehicle D to run according to a corresponding optimal control value.

2. The smooth cooperative lane change control method of claim 1, wherein the motion state of the vehicle B and the motion state of the vehicle C are predicted by using the LSTM-based neural network model through steps of:

acquiring a motion state of the vehicle B in previous m steps and a motion state of the vehicle C in previous m steps, wherein a sampling step interval is dt; and inputting the motion state of the vehicle B in previous m steps and the motion state of the vehicle C in previous m steps into the LSTM-based neural network model which has been trained according to HDV motion state, to obtain a motion state of the vehicle B in next N steps and a motion state of the vehicle C in next N steps.

3. The smooth cooperative lane change control method of claim 1, wherein the steering kinematic model is expressed as:

$$\begin{cases} \dot{x}_M = v_M \cos\varphi_M \\ \dot{y}_M = v_M \sin\varphi_M \\ \dot{\varphi}_M = v_M \dfrac{\tan\delta_M}{L} \\ \dot{v}_M = a_M \end{cases};$$

wherein $x_M$ is a transverse position of the lane-changing vehicle M; $y_M$ is a longitudinal position of the lane-changing vehicle M; $\varphi_M$ is a yaw angle of the lane-changing vehicle M; $v_M$ is an axial speed of the lane-changing vehicle M; $x_M$, $y_M$, $\varphi_M$ and $v_M$ are motion state variables of the lane-changing vehicle M;

$\delta_M$ is a front-wheel steering angle of the lane-changing vehicle M; $a_M$ is acceleration of the lane-changing vehicle M; $\delta_M$ and $a_M$ are motion control inputs of the lane-changing vehicle M; and L is a wheelbase of the lane-changing vehicle M.

4. The smooth cooperative lane change control method of claim 3, wherein a differential form of the steering kinematic model is expressed as:

$$\begin{cases} x_M(k+1) = x_M(k) + v_M(k)\cos(\varphi_M(k))dt, k = 1,2,\ldots,N-1 \\ y_M(k+1) = y_M(k) + v_M(k)\sin(\varphi_M(k))dt, k = 1,2,\ldots,N-1 \\ \varphi_M(k+1) = \varphi_M(k) + v_M(k)\dfrac{\tan(\delta_M(k))}{L}dt, k = 1,2,\ldots,N-1 \\ v_M(k+1) = v_M(k) + a_M(k)dt, k = 1,2,\ldots,N-1 \end{cases}.$$

5. The smooth cooperative lane change control method of claim 1, wherein the longitudinal kinematic model is expressed as:

$$\begin{cases} \dot{x}_i = v_i \\ \dot{v}_i = a_i \end{cases}; i = A, D;$$

wherein $x_i$ (i=A, D) is the longitudinal position of the vehicle A and the vehicle D; $v_i$ (i=A, D) is the longitudinal speed of the vehicle A and the vehicle D; and $a_i$ (i=A, D) is an acceleration of the vehicle A and the vehicle D; and $x_i$ (i=A, D) and $v_i$ (i=A, D) are motion state variables of the vehicle A and the vehicle D, and $a_i$ (i=A, D) is a motion control input of the vehicle A and the vehicle D.

6. The smooth cooperative lane change control method of claim 5, wherein a differential form of the longitudinal kinematic model is expressed as:

$$\begin{cases} x_i(k+1) = v_i(k) + v_i(k)dt + a_i(k)dt^2/2 \\ v_i(k+1) = v_i(k) + a_i(k)dt \end{cases}, i = A, D; k = 1,2,\ldots,N-1;$$

wherein dt is a sampling step interval; and N is length of a predictive horizon.

7. The smooth cooperative lane change control method of claim 1, wherein an objective function of the upper-layer optimization model corresponds to a minimum of a sum of costs of comfort, tracking and traffic efficiency of the lane-changing vehicle M, the vehicle A, the vehicle B and the vehicle C; and an objective function of the lower-layer optimization model corresponds to a minimum of a sum of costs of comfort, tracking and traffic efficiency of the lane-changing vehicle M, the vehicle C and the vehicle D.

8. A terminal, comprising:
a memory; and
a processor;
wherein the memory is configured to store a computer program; and
the processor is configured to execute the computer program to implement the smooth cooperative lane change control method of claim 1.

9. A non-transitory computer-readable storage medium, wherein the non-transitory computer-readable storage medium is configured to store a computer program; and the computer program is configured to be executed by a processor to implement the smooth cooperative lane change control method of claim 1.

* * * * *